W. N. COOK.
EYEGLASSES AND SPECTACLES.
APPLICATION FILED FEB. 24, 1914.

1,228,882.

Patented June 5, 1917.

Witnesses:
Geo. C. Cheney
Henry Moakley

Inventor
William N. Cook
By his Attorneys
Rosenbaum Stockbridge & Borsch

UNITED STATES PATENT OFFICE.

WILLIAM N. COOK, OF NEW YORK, N. Y., ASSIGNOR TO E. B. MEYROWITZ, INC., A CORPORATION OF NEW YORK.

EYEGLASSES AND SPECTACLES.

1,228,882.      Specification of Letters Patent.      Patented June 5, 1917.

Application filed February 24, 1914. Serial No. 820,492.

*To all whom it may concern:*

Be it known that I, WILLIAM N. COOK, a citizen of the United States, residing in the city of New York, in the borough of Manhattan and State of New York, have invented certain new and useful Improvements in Eyeglasses and Spectacles, of which the following is a full, clear, and exact description.

This invention relates to eye-glasses and spectacles, and more specifically to rimmed eye-glasses and spectacles having lenses of circular outline.

In the more recent styles of spectacles and eye-glasses, the round lenses are being largely used, but where a round lens is mounted in a frame or rim, whether of metal, shell, rubber or horn, it has been found to be practically impossible to provide a rim which frictionally engages the peripheral edge of the lens with a sufficient gripping or binding action to prevent inadvertent rotation of the lens. In a split rim, the lens is held against rotation by tightening the screw fastening the free ends of the rim together which binds the rim against the peripheral edge of the lens, but if the screw should loosen even to a slight extent, as it frequently does, the lens is free to rotate. This inadvertent rotation is even more pronounced in a shell or horn frame than in the split frames, since the shell frames are made in one piece and the lens sprung into the groove in the rim while the same is slightly expanded by heat. To provide a rim of the correct size to permit the lens to be sprung into place and yet upon the contraction of the material to grip the lens snugly enough to hold it against turning, requires such nice and accurate manufacturing of the parts that it is practically impossible in the commercial manufacture of the spectacles or eye-glasses.

The result of this inadvertent rotation of the lenses has been the cause of much annoyance to the wearer of this type of glasses or spectacles, for in all forms of round lenses, with a possible exception of a simple lens in which the axis of the lens coincides with its center, any rotation of the lens with respect to the eye of the wearer, decreases his visional power to the extent of making the lens worthless as an aid to vision or even detrimental to his eyes. This would occur when the lenses are such as are used to correct astigmatism, in which lenses the different meridial planes of the lenses are of different focal powers. The same would be true also if compound lenses, cylindrical lenses, prismatic lenses and numerous other forms of lenses are used. The object of the invention is therefore to overcome this defect, and with this object in view, the invention consists of a lock or catch supported by the frame or rim, which lock or catch engages in a depression in the lens and preferably in a notch in the peripheral edge of the same to maintain the parts in fixed relation to each other.

Figure 1:
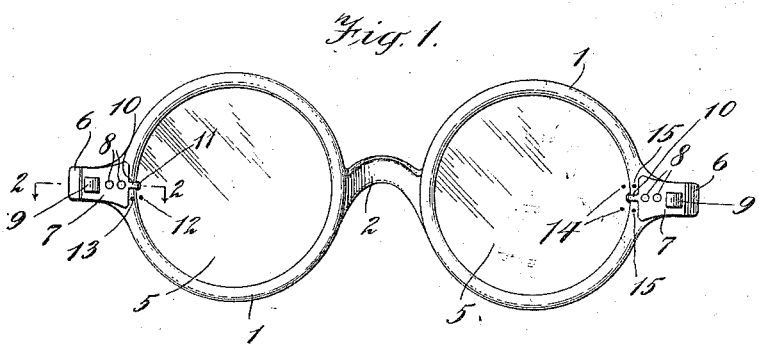
Figure 1 shows a spectacle which is equipped with a fastening device embodying the features of my invention, the temples being omitted for the sake of clearness.
Figure 2:
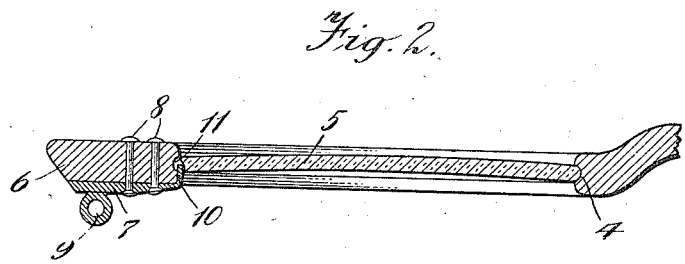
Fig. 2 is a section taken through one of the lenses showing the lock or catch.

In Fig. 1, the frame of the spectacle, which is of horn, tortoise-shell or similar material, comprises annular rims 1 connected by a bridge 2, the rims and bridge being preferably integral. In the inner surface of each of the rims 1 is the usual groove 4, into which the peripheral edges of the circular lenses 5 fit to hold them in place. Extending laterally from the outer portion of each of the rims at a point diametrically opposite the bridge 2, are lugs 6 which are preferably integral with the rims and to which hinge-plates 7 are fastened by pins 8. These hinge-plates carry knuckles 9 to which the temples (not shown) are pivoted, and extending inwardly from the inner end of each of the hinge-plates and preferably integral therewith, is a finger 10, the free end of which is bent down over the surface of the rim and engages in a shallow indentation or notch 11 formed in the peripheral edge of the lens. The notches 11 are so positioned on the peripheral edges of the lenses that when the finger 10 engages a notch, a lens is in a proper position with respect to the eye of the wearer to secure the prescribed corrective effect to his visional power. In assembling a horn or shell spectacle, the rim or frame is first expanded by heat and the lens is then sprung into place in the groove of the rim with the notch 11 in the lens engaged by the finger 10 and upon contraction of the rim, the lens will be maintained in fixed relation to the rim and positively prevented from rotation. But it is to be understood, of course, that the locking of the lens in this fixed relation depends upon the engagement of the finger in the notch, as the frictional engagement between the edge of the lens and the surface of the groove has been found to be insufficient for this purpose. When the temples have been fastened to the members or knuckles 9, the fingers 10 will be practically invisible and hence will not detract from the appearance of the spectacle.

It is also evident that the formation of a notch in the peripheral edge of the lens at a determined point, insures that the lens will be in its proper position when assembled, if the right and left eye lenses have not been interchanged, and to guard against this, it has been found desirable to mark the lens for the left eye with a small dot 12, adjacent its peripheral edge, which is so positioned on the lens that when the same is placed in position in the frame, this dot will be directly opposite a corresponding dot 13 marked on the edge of the rim. The lens for the right eye is marked with two dots 14, while on the outer edge of the frame opposite these dots are two corresponding dots 15. The assembling of the lenses within the frame is therefore a comparatively simple matter and the markings on the lenses will also aid in properly positioning the lenses in a new frame should the old one become broken or need repairing.

Figure 3:
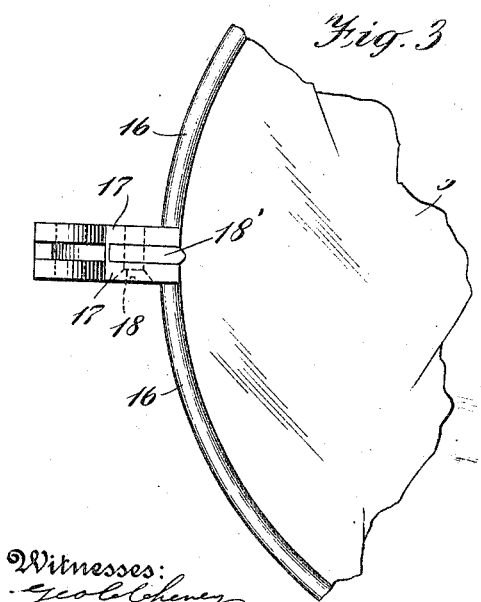
Figs. 3 and 4 are detail views showing a modified form of catch, which is adapted for use with a split rim.
Figure 4:
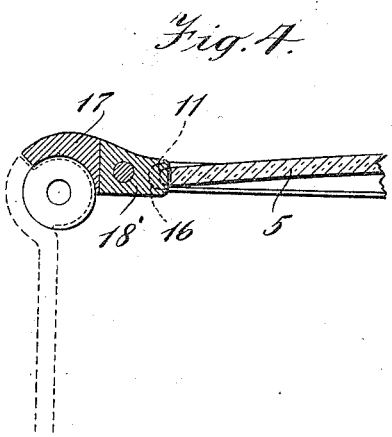

In Figs. 3 and 4, there is shown a construction which is adapted for use with a split rim. The split metal rim 16 adjacent its joint is provided with two lugs 17, as is the usual construction, which are fastened together in the usual manner by a screw 18, the lugs forming a pivotal support for the temples, one of which is shown in part in dotted lines (see Fig. 4). Interposed between the two adjacent faces of the two lugs 17 is a small strip of metal 18' in the nature of a shim, which is held in place by the screw 18 with the inner end of the shim projecting sufficiently beyond the groove in the rim to engage in the notch 11 and to positively lock the lens against rotation. The notch is formed at a determined point in the edge of the lens in a similar manner to that previously described and the results obtained by the use of such a shim are identical with that obtained by the use of a finger projecting from the hinge-plate.

The invention in either of its illustrated forms or in other modified constructions of the same, is adapted to be used with all types of rimmed spectacles and eyeglasses in which circular lenses are utilized, and in which the lenses are supported in metal, horn, or shell rims or frames, split or in one piece, and it is not my intention to be limited to the specific constructions which have been described, but only by the scope of the claims appended hereto, wherein the term "circular" is deemed sufficiently broad to cover lenses and lens frames of slightly elliptical shape in which there is a danger of inadvertent rotation of the lenses.

I claim:—

1. In combination, a spectacle frame consisting of rims and a bridge of horn or like material, said rims being annular in shape and having grooves therein, rounded lenses mounted in said grooves, a projection on the outer half of each of said rims integral therewith and on a level with the bridge, a hinge-plate secured to the rear face of each of said projections, a temple hinged to each of said plates, each of said lenses having a notch in the edge thereof adjacent a hinge-plate and a projection on each hinge-plate extending from the inner end thereof and having its end fitting into the notch in the corresponding lens.

2. The combination with a spectacle frame comprising a bridge and a pair of rims connected therewith, each of said rims being annular in shape, continuous and unbroken throughout, and having an annular groove therein, of round lenses mounted in the grooves in said rims, each having a notch in its edge, and plates secured to said rims, each having a finger thereon which extends into the notch in the lens in said rim.

In witness whereof I subscribe my signature in the presence of two witnesses.

WILLIAM N. COOK.

Witnesses:
WALDO M. CHAPIN,
JOSEPH BUCKLEY.